United States Patent
Binek et al.

(10) Patent No.: US 11,248,789 B2
(45) Date of Patent: Feb. 15, 2022

(54) GAS TURBINE ENGINE WITH INTEGRAL COMBUSTION LINER AND TURBINE NOZZLE

(71) Applicant: UNITED TECHNOLOGIES CORPORATION, Farmington, CT (US)

(72) Inventors: Lawrence Binek, Glastonbury, CT (US); Jesse R. Boyer, Middletown, CT (US); Dmytro Mykolayovych Voytovych, Rocky Hill, CT (US)

(73) Assignee: Raytheon Technologies Corporation, Farmington, CT (US)

(*) Notice: Subject to any disclaimer, the term of this patent is extended or adjusted under 35 U.S.C. 154(b) by 354 days.

(21) Appl. No.: 16/212,879

(22) Filed: Dec. 7, 2018

(65) Prior Publication Data

US 2020/0182467 A1 Jun. 11, 2020

(51) Int. Cl.
F23R 3/00 (2006.01)
F23R 3/16 (2006.01)
F23R 3/26 (2006.01)
F23R 3/04 (2006.01)
F23R 3/06 (2006.01)

(52) U.S. Cl.
CPC .............. *F23R 3/002* (2013.01); *F23R 3/045* (2013.01); *F23R 3/06* (2013.01); *F23R 3/16* (2013.01); *F23R 3/26* (2013.01)

(58) Field of Classification Search
CPC .... F23R 3/002; F23R 3/06; F23R 3/04; F23R 3/045; F23R 3/26; F23R 3/10; F23R 3/34; F01D 9/023
See application file for complete search history.

(56) References Cited

U.S. PATENT DOCUMENTS

| 3,531,934 | A | * | 10/1970 | Hope-Gill | F02C 3/04 60/774 |
| 4,301,657 | A | * | 11/1981 | Penny | F23R 3/12 60/748 |
| 4,314,443 | A | * | 2/1982 | Barbeau | F02C 7/18 60/751 |
| 4,844,692 | A | * | 7/1989 | Minkkinen | F01D 11/08 415/208.1 |

(Continued)

FOREIGN PATENT DOCUMENTS

| CN | 108590859 | 9/2018 |
| EP | 3115691 | 1/2017 |

(Continued)

OTHER PUBLICATIONS

The Extended European Search Report for European Patent Application No. 19214300.6 dated May 8, 2020.

*Primary Examiner* — William H Rodriguez
(74) *Attorney, Agent, or Firm* — Carlson, Gaskey & Olds, P.C.

(57) ABSTRACT

A core engine article includes a combustor liner defining a combustion chamber therein and a turbine nozzle. The combustor liner includes a plurality of injector ports, and the plurality of injector ports have a shape that tapers to a corner on a forward side of the injector ports. The turbine nozzle includes a plurality of airfoils. The combustor liner and turbine nozzle are integral with one another. A method of making a core engine article is also disclosed.

13 Claims, 4 Drawing Sheets

(56) References Cited

U.S. PATENT DOCUMENTS

| | | | |
|---|---|---|---|
| 4,926,630 A * | 5/1990 | Shekleton | F02C 3/05 60/758 |
| 4,967,563 A * | 11/1990 | Shekleton | F23C 5/00 60/39.826 |
| 5,022,817 A * | 6/1991 | O'Halloran | F01D 5/18 415/115 |
| 5,220,794 A * | 6/1993 | Sledd | F23C 5/00 60/737 |
| 5,235,805 A * | 8/1993 | Barbier | F23R 3/045 60/39.23 |
| 5,263,316 A * | 11/1993 | Shekleton | F02G 1/00 60/743 |
| 5,277,022 A * | 1/1994 | Shekleton | F23R 3/54 60/737 |
| 5,317,864 A * | 6/1994 | Shorb | F23R 3/28 60/804 |
| 5,590,530 A * | 1/1997 | Owen | F23R 3/045 60/748 |
| 5,953,919 A | 9/1999 | Meylan | |
| 6,351,949 B1 * | 3/2002 | Rice | F23R 3/60 60/752 |
| 8,250,851 B1 | 8/2012 | Brostmeyer | |
| 9,404,654 B2 | 8/2016 | Cunha et al. | |
| 9,482,432 B2 | 11/2016 | Cunha et al. | |
| 2004/0003599 A1 * | 1/2004 | Ingram | F23R 3/50 60/804 |
| 2004/0216463 A1 * | 11/2004 | Harris | F23R 3/12 60/776 |
| 2004/0231336 A1 * | 11/2004 | Westlake | F23R 3/045 60/748 |
| 2006/0288686 A1 * | 12/2006 | Cherry | F01D 9/02 60/226.1 |
| 2008/0134682 A1 * | 6/2008 | Garry | F23R 3/06 60/752 |
| 2010/0218504 A1 * | 9/2010 | Bronson | F23R 3/045 60/754 |
| 2011/0182715 A1 * | 7/2011 | Leithead | F04D 29/563 415/148 |
| 2012/0297778 A1 * | 11/2012 | Rudrapatna | F23R 3/045 60/755 |
| 2012/0328421 A1 * | 12/2012 | McMahan | F23R 3/346 415/182.1 |
| 2013/0086908 A1 * | 4/2013 | Negulescu | F23R 3/50 60/726 |
| 2013/0167543 A1 * | 7/2013 | McMahan | F01D 9/023 60/752 |
| 2014/0096528 A1 * | 4/2014 | Cunha | F23R 3/005 60/755 |
| 2014/0102112 A1 * | 4/2014 | Jewess | F01D 15/10 60/776 |
| 2015/0362190 A1 * | 12/2015 | Taylor | F23R 3/002 60/752 |
| 2016/0252019 A1 * | 9/2016 | Joshi | F02C 9/20 60/776 |
| 2017/0009989 A1 | 1/2017 | Clemen | |
| 2017/0045226 A1 * | 2/2017 | Cheung | F23R 3/002 |
| 2017/0059159 A1 * | 3/2017 | Varney | C04B 41/81 |
| 2017/0276369 A1 * | 9/2017 | Berry | F02C 7/22 |
| 2017/0292400 A1 * | 10/2017 | Bifulco | F04D 27/0246 |
| 2017/0370583 A1 * | 12/2017 | Marusko | F23R 3/002 |
| 2018/0187563 A1 * | 7/2018 | Laster | F23R 3/346 |
| 2018/0187607 A1 * | 7/2018 | Hughes | F23R 3/34 |
| 2018/0216822 A1 * | 8/2018 | Noe | F01D 9/04 |
| 2018/0238184 A1 * | 8/2018 | Reynolds | F01D 11/005 |
| 2018/0266264 A1 * | 9/2018 | Kerns | F01D 11/04 |
| 2018/0266328 A1 * | 9/2018 | Kelly | F01D 25/34 |
| 2018/0313535 A1 * | 11/2018 | North | F23D 11/12 |
| 2019/0178498 A1 * | 6/2019 | Wilson | F23R 3/346 |
| 2019/0226680 A1 * | 7/2019 | North | F23R 3/346 |
| 2019/0309952 A1 * | 10/2019 | Miduturi | F23R 3/346 |
| 2020/0109859 A1 * | 4/2020 | Binek | F23R 3/283 |
| 2020/0191061 A1 * | 6/2020 | Boyer | F02C 7/32 |
| 2020/0208840 A1 * | 7/2020 | Sauer | F23R 3/045 |
| 2020/0362724 A1 * | 11/2020 | Binek | B33Y 80/00 |
| 2021/0018174 A1 * | 1/2021 | Lao | F23R 3/283 |
| 2021/0025323 A1 * | 1/2021 | Nakao | F02C 3/22 |
| 2021/0088217 A1 * | 3/2021 | Binek | F23R 3/16 |
| 2021/0156563 A1 * | 5/2021 | Binek | F02C 7/12 |

FOREIGN PATENT DOCUMENTS

| | | |
|---|---|---|
| EP | 3633268 | 4/2020 |
| FR | 2992018 | 12/2013 |

\* cited by examiner

GAS TURBINE ENGINE WITH INTEGRAL COMBUSTION LINER AND TURBINE NOZZLE

BACKGROUND

Attritable or expendable propulsion systems are designed for single-use or only a few uses, as compared to typical flight applications (e.g., commercial aircraft) that are used repeatedly over hundreds or thousands of cycles. For example, the propulsion systems may be used to power small, unmanned aircraft. Still, the propulsion systems must be reliable and occasionally must exhibit a minimal degree of maintainability.

The attritable or expendable propulsion systems generally include a compressor, a combustor, a turbine, and a turbine nozzle. These components each have various subcomponents, such as casings and fluid ports

SUMMARY

A core engine article according to an example of the present disclosure includes a combustor liner defining a combustion chamber therein and a turbine nozzle. The combustor liner includes a plurality of injector ports, and the plurality of injector ports have a shape that tapers to a corner on a forward side of the injector ports. The turbine nozzle includes a plurality of airfoils. The combustor liner and turbine nozzle are integral with one another.

In a further embodiment according to any of the foregoing embodiments, the plurality of injector ports have a maximum dimension greater than about 0.1 in (0.254 cm).

In a further embodiment according to any of the foregoing embodiments, the injector ports are diamond-shaped.

In a further embodiment according to any of the foregoing embodiments, a webbing extends outward from the combustor liner along an extent of a periphery of the injector ports.

In a further embodiment according to any of the foregoing embodiments, the injector ports extend into the combustion chamber.

In a further embodiment according to any of the foregoing embodiments, the turbine nozzle includes an inner annulus and an outer annulus, the inner annulus extends into the combustion chamber, and the combustor liner is arranged between the inner annulus and the outer annulus.

In a further embodiment according to any of the foregoing embodiments, a lip extends from the inner annulus contacts the combustor liner.

In a further embodiment according to any of the foregoing embodiments, the airfoils extend from an exterior of the outer annulus.

In a further embodiment according to any of the foregoing embodiments, an aft end of the combustor liner includes one or more scallops.

A core engine article according to an example of the present disclosure includes a combustor liner defining a combustion chamber and a turbine nozzle. The combustor chamber includes a plurality of injector ports. The turbine nozzle includes a plurality of airfoils. The airfoils are each arranged along an airfoil axis, and an angle α between the airfoil axis and a central axis of the core engine article is greater than about 32 degrees. The combustor liner and turbine nozzle are integral with one another.

In a further embodiment according to any of the foregoing embodiments, the angle α is about 45 degrees.

In a further embodiment according to any of the foregoing embodiments, the turbine nozzle includes an inner annulus and an outer annulus, the inner annulus extends into the combustion chamber, and the combustor liner is arranged between the inner annulus and the outer annulus.

In a further embodiment according to any of the foregoing embodiments, a rib extends from the inner annulus contacts the combustor liner.

In a further embodiment according to any of the foregoing embodiments, the airfoils extend from an exterior of the outer annulus.

In a further embodiment according to any of the foregoing embodiments, an aft end of the combustor liner includes one or more scallops, the scallops are configured to accelerate air flowing through the core engine article.

A method of making a core engine article according to an example of the present disclosure includes depositing material using an additive manufacturing technique to form a turbine nozzle in a build direction and depositing material using the additive manufacturing technique to form a combustor liner in the build direction. The combustor liner is supported by the turbine nozzle during the build.

In a further embodiment according to any of the foregoing embodiments, forming the combustor liner includes forming a plurality of injector ports, and the injector ports have a maximum dimension greater than about 0.1 in (0.254 cm).

In a further embodiment according to any of the foregoing embodiments, the plurality of injector ports have a shape that tapers to a corner on a top side with respect to the build direction.

In a further embodiment according to any of the foregoing embodiments, forming the turbine nozzle includes forming a plurality of airfoils on an outer surface of the turbine nozzle, and the airfoils have an orientation with respect to the build direction such that they are self-supporting during the build.

In a further embodiment according to any of the foregoing embodiments, the airfoils are each built along an airfoil axis, and an angle α between the airfoil axis and the build direction is greater than about 32 degrees.

DETAILED DESCRIPTION

Figure 1:
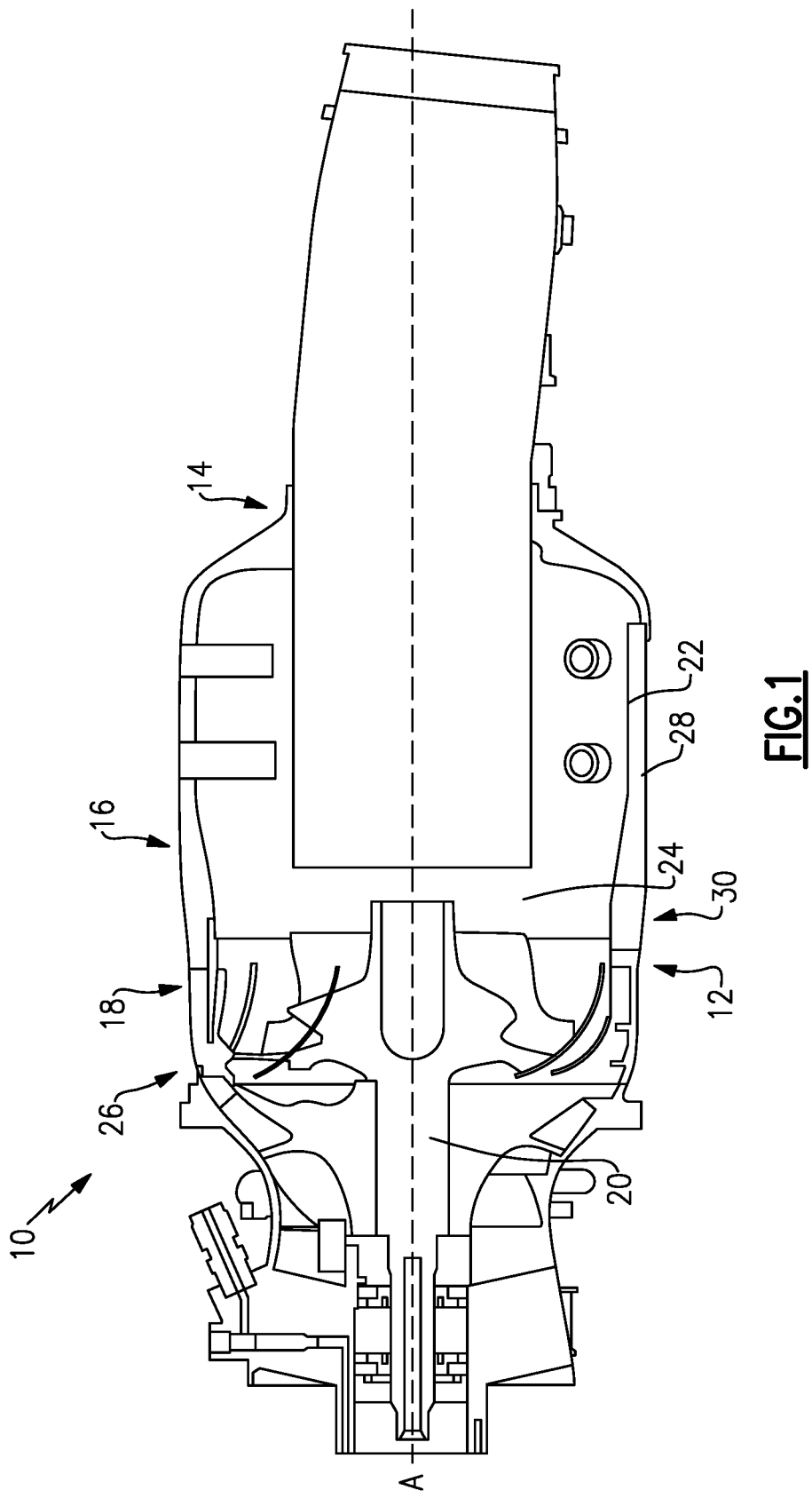
FIG. 1 schematically shows an attritable/expendable propulsion system.

FIG. 1 schematically shows an example attritable/expendable propulsion system 10. The propulsion system 10 can be used to power an attritable/expendable aircraft, such as a small unmanned aircraft. The propulsion system 10 is designed for single-use or limited-use, but meets the reliability and maintainability requirements for the particular application. As an example, an attritable/expendable propulsion system may have a design life of only a few hours, after which the mission has ended and the propulsion system is rendered inoperable and cannot be recovered/refurbished.

The propulsion system 10 includes a core engine 12, which includes a compressor 14, a combustor 16, and a turbine 18 arranged along a shaft 20, which is arranged along central engine axis A. The combustor 16 has a liner 22 which defines a combustion chamber 24 therein. In general, air is drawn into the compressor 14 for compression and communication into the combustion chamber 24 and then expansion through the turbine 18. Air exits the turbine via turbine nozzle 26. An outer casing 28 surrounds the core engine 12.

Figure 2B:
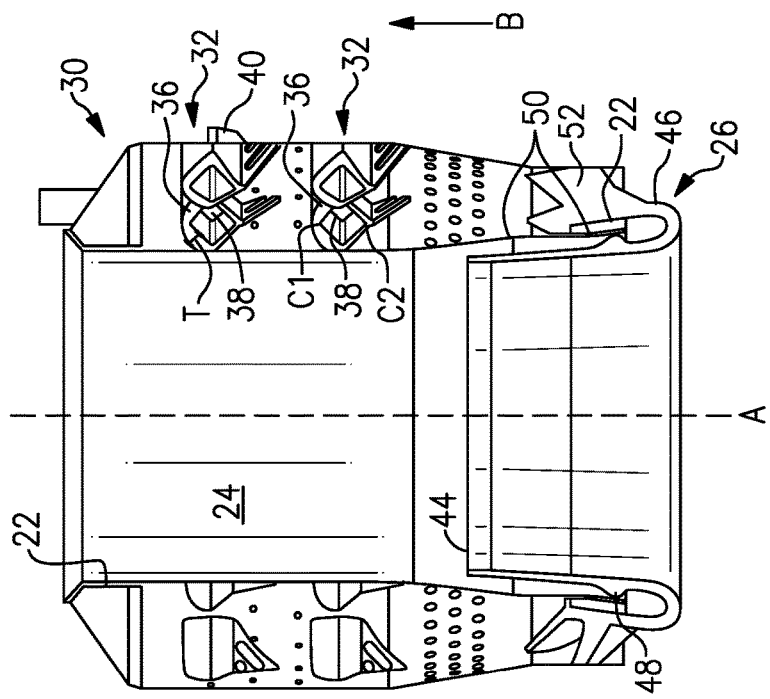
FIG. 2B schematically shows a cutaway view of a core engine article of FIG. 2A.
Figure 2C:
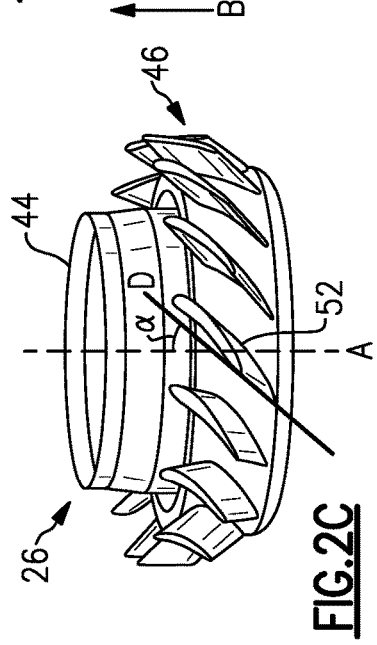
FIG. 2C schematically shows a turbine nozzle of core engine article of FIG. 2A.
Figure 2A:
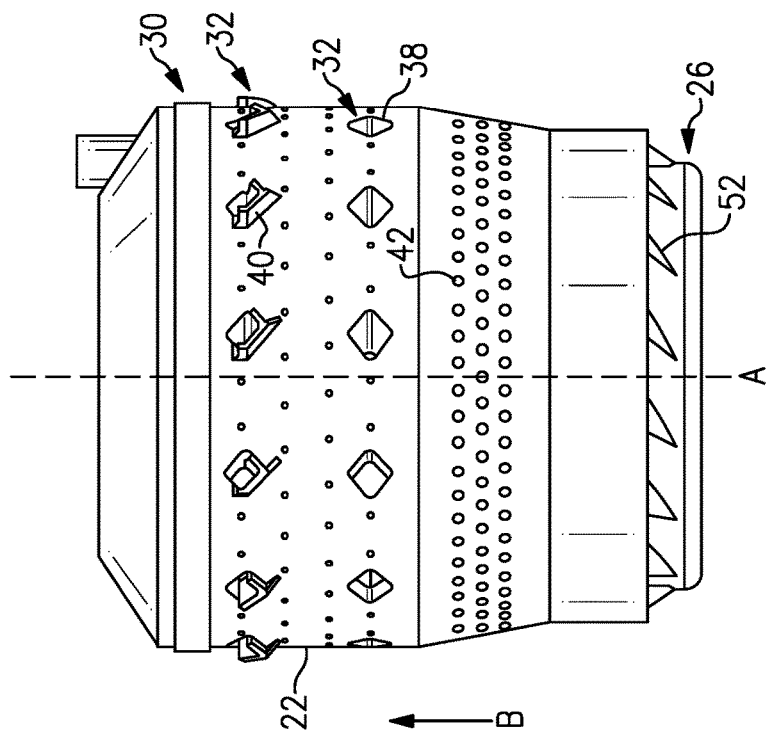
FIG. 2A schematically shows a core engine article for the attritable/expendable propulsion system of FIG. 1.

In the example of FIGS. 2A-C, the propulsion system 10 includes a core engine article 30, which is an integral (unitary) structure that incorporates the combustor liner 22 and turbine nozzle 26. Known combustors may include dozens of separate components. In contrast, the present core engine article 30 is a single, integral (unitary) piece formed by additive manufacturing, which is discussed in more detail below.

The combustor liner 22 is generally annular in shape and includes a plurality of injector ports 32 through which atomized fuel is injected into the combustion chamber 24. The injector ports 32 have a shape and location/arrangement that are configured to be fabricated by additive manufacturing, as is discussed in more detail below. In this example, the injector ports 32 are diamond-shaped. However, other shapes are contemplated.

The injector ports 32 include a wall 36 that circumscribes an interior passage and corresponds to an opening 38. That is, the wall 36 has a tubular shape that tracks the circumferential shape of the opening 38. In the example of FIG. 2A-B, the wall 36 has one end that extends into the combustion chamber 24 to an extent past the inner surface of the combustor liner 22 and a second end that is flush with an outer wall of the combustor liner 22.

A webbing 40 extends outward from the combustor liner 22 along at least a portion of the periphery of the injector ports 32. The webbing 40 acts as a support for fuel injectors (not shown) which provide the atomized fuel, and facilitate unimpeded combustion within the combustion chamber 24. In the example of FIGS. 2A-B, the webbing 40 extends along less than the entire circumference of the injector ports 32.

The combustor liner 22 also includes a plurality of cooling holes 42. The cooling holes 42 can have varying sizes and arrangements around the combustor liner 22. In the example of FIGS. 2A-B, the cooling holes 42 are round and have varying diameters. In other examples, other shapes and diameters can be used.

The turbine nozzle 26 has an inner annulus 44 and an outer annulus 46. An aft end of the combustor liner 22 is interposed between the inner annulus 44 and the outer annulus 46 relative to a central axis A of the propulsion system 10.

A rib 48 extends circumferentially around an outer surface of the inner annulus 44 at an aft end of the inner annulus 44 (e.g., adjacent a meeting point of the inner annulus 44 and outer annulus 46). The rib 48 contacts the combustor liner 22 and sandwiches the combustor liner 22 between the rib 48 and outer annulus 46.

Figure 2D:
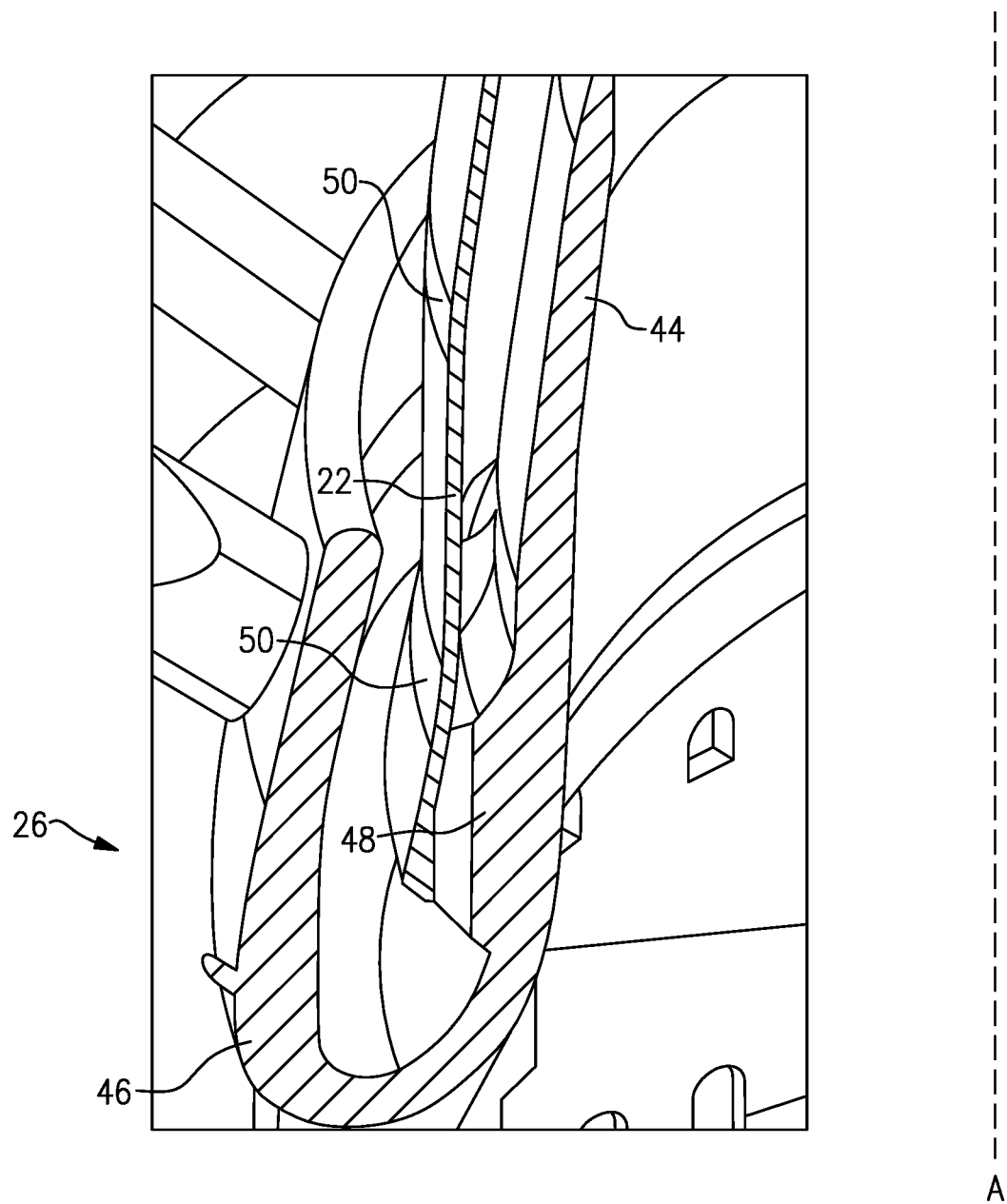
FIG. 2D schematically shows a detail view of the core engine article of FIG. 2A.

An aft end of the liner 22 includes one or more scallop features 50, as best seen in FIG. 2D. In this example, there are two scallops 50, but in other examples, more or less scallops 50 can be used. The scallops 50 are ramps that increase the radius of the outer wall of the combustor liner 22 along the extent of the scallop 50 in the aft direction, towards the meeting point of the inner annulus 44 and the outer annulus 46 of the turbine nozzle 26. The ramp shape of the scallops 50 accelerates air as it flows past the scallops 50 and into space between the aft end of the combustor liner 22 and the inner annulus 44 in an aftward direction. The acceleration of the air allows it to reverse directions and flows out of the space (in a forward direction) and back into the combustion chamber 24. Directing air back into the combustion chamber 24 in this manner improves the combustion efficiency of the combustor 16 because it minimizes air (oxygen) loss.

After flowing through the core engine article 30, air ultimately exits the via the turbine nozzle 26. This airflow pattern maximizes combustion efficiency for the propulsion system 10. The scallop features 50 also contribute to the structural integrity of the core engine article 30 by providing reinforcement.

The outer annulus 46 has a plurality of dihedral airfoils 52 arranged circumferentially. The dihedral airfoils 52 have a geometry and location/arrangement that meets the performance requirements of the propulsion system 10 and are configured to be fabricated by additive manufacturing, which is discussed in more detail below. The dihedral airfoils 52 extend along an axis D which is angled with respect to the central engine axis A and build direction B.

The core engine article 30 is manufactured by an additive manufacturing technique. Additive manufacturing involves building an article layer-by-layer from a powder material by consolidating selected portions of each successive layer of powder until the complete article is formed. For example, the powder is fed into a chamber, which may be under vacuum or inert cover gas. A machine deposits multiple layers of the powder onto one another. An energy beam, such as a laser, selectively heats and consolidates each layer with reference to a computer-aided design data to form solid structures that relate to a particular cross-section of the article. Other layers or portions of layers corresponding to negative features, such as cavities or openings, are not joined and thus remain as a powdered material. The unjoined powder material may later be removed using blown air, for example. With the layers built upon one another and joined to one another cross-section by cross-section, the article is produced. The article may be post-processed to provide desired structural characteristics. For example, the article may be heat treated to produce a desired microstructure. Additive manufacturing processes can include, but are not limited to, selective laser melting, direct metal laser sintering, electron beam melting, 3D printing, laser engineered net shaping, or laser powder forming. In this regard, the core engine article 30 is seamless with regard to distinct boundaries that would otherwise be formed using techniques such as welding or brazing. Thus, the (monolithic) core engine article 30, in one example, is free of seams such that there are no distinct boundaries or discontinuities in the core engine article 30 that are visually or microscopically discernable.

Figure 3:
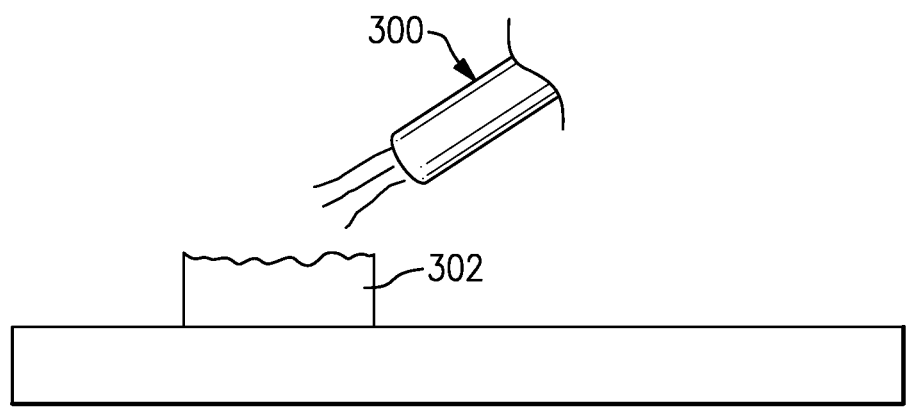
FIG. 3 schematically shows an additive manufacturing tool.

FIG. 3 schematically shows an example additive manufacturing tool 300, such as a laser, which can print a component 302 by any of the additive manufacturing techniques described above or another additive manufacturing technique. In the example of FIG. 3, the additive manufacturing tool 300 is printing the core engine article 30 described above, however, the additive manufacturing tool 300 can print any of the structures described herein.

Additive manufacturing of the core engine article 30 proceeds in a build direction B as shown in FIGS. 2A-C. In general, relatively complex shapes can be achieved using additive manufacturing. There are, however, limitations. For instance, as an article is being built layer-by-layer in the build direction, the structures that are being built must be self-supporting. Otherwise, the article may break or warp, which may also damage the additive manufacturing equipment. As an example, structures that cantilever perpendicularly from the built direction are often not self-supporting and thus increase the risk of fracture or warping. In this regard, although the core engine article 30 is an integration of two functional sections, here the liner 22 and the nozzle 26, the configurations of the sections are adapted to be formed by additive manufacturing, as discussed further below. The core engine article 30 thus represents a substantial redesign of the functional sections to achieve both good performance and manufacturability by additive manufacturing.

The build direction B is parallel to the central engine axis A. As shown, the build begins with the turbine nozzle 26 and proceeds to the combustor liner 22 with injector ports 32. The turbine nozzle 26 supports the combustor liner 22 during the build.

As discussed above, the shape and location/arrangement of the injector ports 32 is selected to meet the performance requirements of the propulsion system. Still, the shape and location/arrangement of the injector ports 32 are configured to be fabricated by additive manufacturing. For instance, additive manufacturing techniques can be used to create circular holes in a build piece with diameters up to about 0.1 inch (0.254 cm). For circular holes greater than about 0.1 inch in diameter, a build piece manufactured with additive manufacturing can exhibit undesirable surface roughness on the top (downward-facing) surface of the hole with respect to the build direction B. The undesirable surface roughness is related to the angle of curvature the downward-facing surface with respect to the build direction. For metal powder bed fusion additive manufacturing techniques there is no solid metal heat sink below the melt pool when building a hole or opening. Accordingly, the amount of energy supplied to the downward facing surface and the amount of energy absorbed by the powder are affected. This change in energy can cause surface roughness due to extra material or lack of material (negative material) of the surrounding geometry, and depending on the powder size and powder distribution. Roughness requires post-processing so smooth the surface, because roughness impacts the aerodynamics of airflow past the surface, which can result in inefficiencies and disruptions in the airflow.

On the other hand, hole shapes which taper to a corner on the top (downward-facing) surface of the hole with respect to the build direction B do not exhibit the surface roughness problem with a maximum dimension larger than 0.1 inches. This is because the angle of curvature of the downward-facing surface is small enough to avoid the material movement/shifting discussed above.

In FIGS. 2A-B, the top, downward-facing surface corresponds to and aft surface in relation to the propulsion system 10 and axis A. The injector ports 32 have a diamond-shaped geometry wherein the top/aft surface of the wall 36 tapers to a corner C1 and the bottom/forward surface of the wall 36 tapers to a corner C2. Another example shape is a teardrop shape, with the top surface of the wall tapering to a point and a bottom/forward surface of the wall having a rounded shape. In this example, the injector ports 32 have a maximum dimension larger than 0.1 inches.

As shown in FIG. 2B, the wall 36 has a thickness T that extends between an inner and outer surfaces of the wall. The outer surface of the wall may or may not track the same shape as the inner surface of the wall. For instance, in FIG. 2B, the outer surface of the wall has a more rounded shape than the inner surface of the wall, which has corners C1 and C2.

Like the injector ports 32, the dihedral airfoils 52 have a geometry that is configured to be formed by additive manufacturing. The dihedral airfoils 52 extend along an axis D with respect to the central engine axis A. During the additive manufacturing build, the dihedral airfoils 52 must have enough structural integrity and be arranged with respect to the body of the turbine nozzle 26 so that they are self-supporting. As can be appreciated, the dihedral airfoils 52 extend outward from the turbine nozzle 26 but do not reach the very bottom surface of the turbine nozzle 26 (which corresponds to an aft end of the turbine nozzle 26) from which the build proceeds. Accordingly, during the build, the dihedral airfoils 52 extend out from the turbine nozzle 26 without support. The angle $\alpha$ of the axis D with respect to the central engine axis A/build direction B is selected to ensure that the dihedral airfoils 52 are self-supporting during the build. If the angle $\alpha$ is too small, e.g., the dihedral airfoils 52 are essentially parallel to the central engine axis, the dihedral airfoils 52 cannot support themselves during the build and can collapse or have imperfections in the material deposited by additive manufacturing that can be subject to thermal distortion during operation of the propulsion system 10. In one example, the angle $\alpha$ is greater than about 32 degrees. In a further example, the angle $\alpha$ is about 45 degrees.

Additive manufacturing of the core engine article 30 allows for unitizing of propulsion system 10 assemblies, integrates complex performance-enhancing features of the propulsion system 10 with one another, lowers production costs, reduces manufacturing and assembly time/complexity, and allows for quick design changes/iterations when necessary. These benefits are particularly important to attributable/expendable systems because of the low cost-target and assembly effort requirements.

Furthermore, in this example, the additive manufacturing technique allows for the formation of certain small and/or geometrically complex features such as the injector ports 32 and dihedral airfoils 52 that would be difficult or impossible to form with a traditional casting process.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A core engine article, comprising:
   a combustor liner defining a combustion chamber therein, the combustor liner including a plurality of injector ports, the plurality of injector ports having a shape that tapers to a corner on a side of the injector ports; and
   a turbine nozzle, the turbine nozzle including a plurality of airfoils, an inner annulus, and an outer annulus, the inner annulus extends into the combustion chamber, and the combustor liner is arranged between the inner annulus and the outer annulus;
   wherein the combustor liner and turbine nozzle are integral with one another.

2. The core engine article of claim 1, wherein the fuel injector ports are diamond-shaped.

3. The core engine article of claim 1, further comprising a webbing extending outward from the combustor liner along an extent of a periphery of the fuel injector ports.

4. The core engine article of claim 3, wherein the webbing is configured to support a fuel injector.

5. The core engine article of claim 1, wherein the fuel injector ports extend into the combustion chamber.

6. The core engine article of claim 1, wherein a rib extending from the inner annulus contacts the combustor liner.

7. The core engine article of claim 1, wherein the airfoils extend from an exterior of the outer annulus.

8. The core engine article of claim 1, wherein an end of the combustor liner includes one or more scallops.

9. The core engine article of claim 8, wherein the scallops are configured to accelerate air flowing through the core engine article.

10. The core engine article of claim 8, wherein the scallops are configured to accelerate airflow through the core engine article in a direction that is a reverse of the direction of the airflow.

11. The core engine article of claim 1, wherein the airfoils are each arranged along an airfoil axis, and an angle $\alpha$ between the airfoil axis and a central axis of the core engine article is 45 degrees.

12. The core engine article of claim 1, wherein each of the plurality of fuel injector ports are configured to receive atomized fuel into the combustion chamber.

13. The core engine article of claim 1, wherein the combustion chamber is configured to receive airflow in a direction parallel to a central axis of the core engine article.

* * * * *